(No Model.) 2 Sheets—Sheet 1.

C. B. RUMSEY.
CLUTCH.

No. 541,444. Patented June 18, 1895.

Witnesses:
Thomas Durant
Alex J. Stewart

Inventor:
Charles B. Rumsey,
By Church & Church
His Attys.

(No Model.) 2 Sheets—Sheet 2.
C. B. RUMSEY.
CLUTCH.
No. 541,444. Patented June 18, 1895.
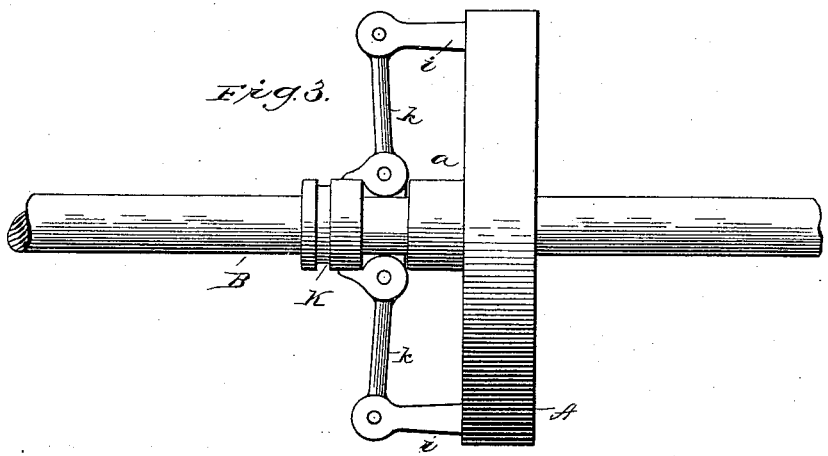
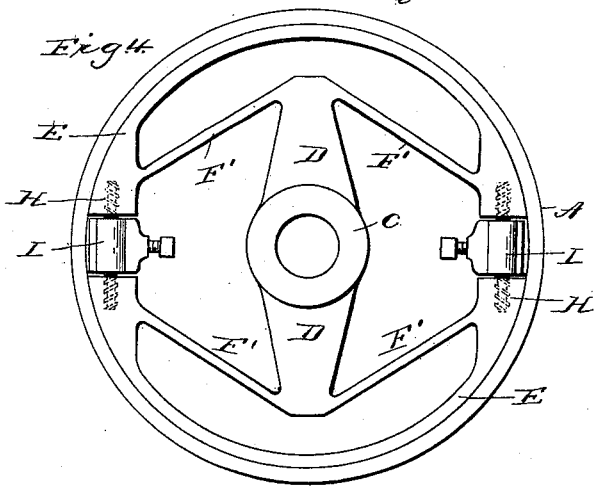
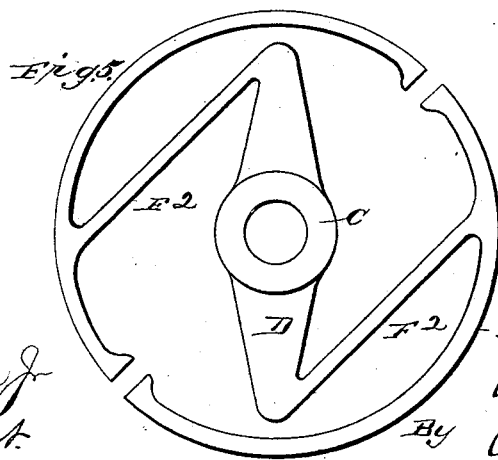
Witnesses
J. M. Fowler Jr.
Aly S. Stewart
Inventor
Charles B. Rumsey
By Church & Church
his Attorneys.
THE NORRIS PETERS CO., PHOTO-LITHO., WASHINGTON, D. C.

UNITED STATES PATENT OFFICE.

CHARLES B. RUMSEY, OF HOMER, NEW YORK.

CLUTCH.

SPECIFICATION forming part of Letters Patent No. 541,444, dated June 18, 1895.

Application filed January 4, 1894. Serial No. 495,699. (No model.)

*To all whom it may concern:*

Be it known that I, CHARLES B. RUMSEY, of Homer, in the county of Cortland and State of New York, have invented certain new and useful Improvements in Friction-Clutches; and I do hereby declare the following to be a full, clear, and exact description of the same, reference being had to the accompanying drawings, forming a part of this specification, and to the letters of reference marked thereon.

This invention has for its object to provide a simple and convenient friction clutch which may be operated with little expenditure of power and which will afford the maximum gripping or clutching power for the transmission of the motion of the moving parts.

The invention consists first in mounting the clutch segments on spring arms, which latter form the sole driving connection with the rigid driving arms, the said spring arms being attached to the ends of the driving arms and being in length equal to or less than equal to the hypotenuse of a right angle triangle joining its base and perpendicular within the circumference of the segments, said right angle triangle having its right angle at the center of rotation of the clutch, the relative positions of the parts being such that a straight line drawn through both ends of any spring arm will not intersect any other spring arm.

Secondly, the invention consists in extending the before mentioned spring driving arms in approximately straight lines from the ends of the driving arms to the clutch segments.

Further, the invention consists in certain novel details of construction and combinations and arrangements of parts all as will be now described and pointed out particularly in the appended claims.

Figure 1:
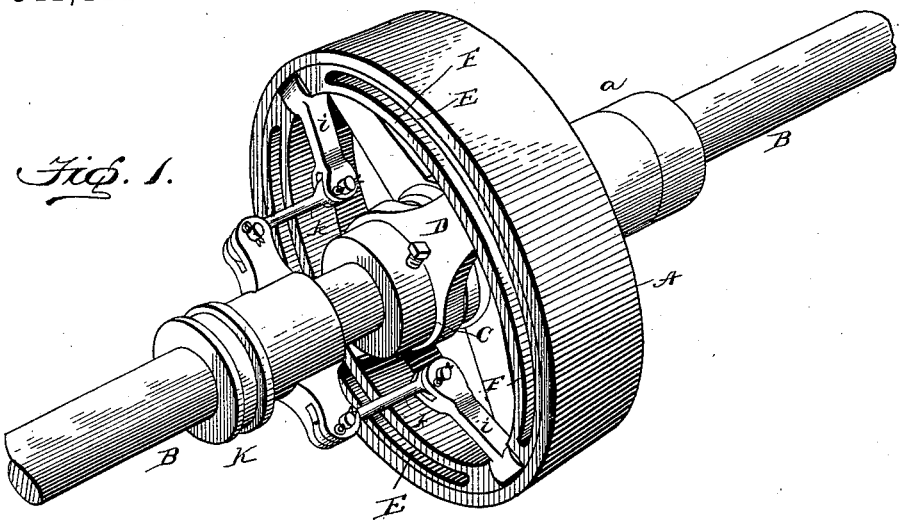
Figure 2:
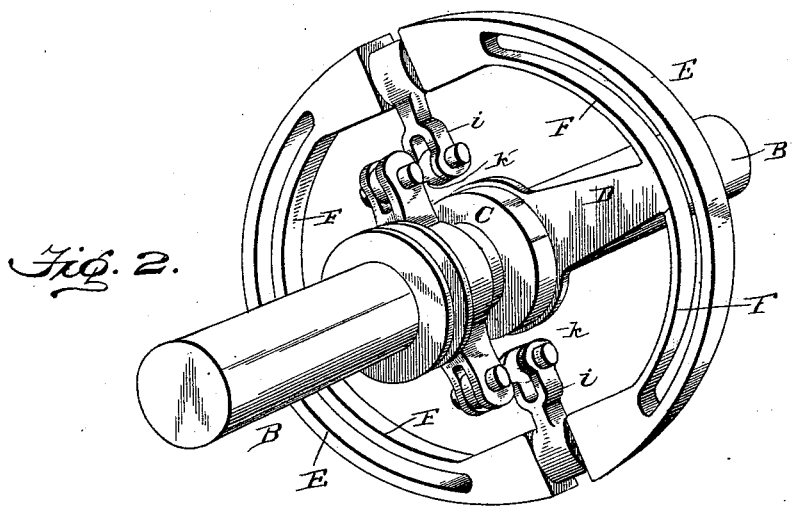

Referring to the accompanying drawings, Figure 1 is a perspective view of a clutch constructed in accordance with my present invention. Fig. 2 is a similar view of the movable segments, driving-arms, and spring-arms carrying the segments, with the operating mechanism therefor. Fig. 3 is a side elevation. Figs. 4 and 5 are end views illustrating slightly-different forms of spring-arm, which show the principle involved more clearly.

Like letters of reference in the several figures indicate the same parts.

In carrying this invention into practice, a drum or pulley A of usual construction, is provided and having upon its inner side a friction surface, the drum itself being adapted to be mounted upon a shaft or equivalent B. In the preferred construction, the drum or pulley A is journaled loosely on the shaft and held against longitudinal movement by collars or equivalent $a$ and is the member from which power is taken by means of a belt and transmitted to the machinery to be driven. Within the drum, and mounted rigidly, by means of a set screw or otherwise upon the shaft, is a hub C having rigid driving arms D formed radially thereon. These arms D, which it is obvious may be simple projections of any kind, terminate at a point in proximity to the inner surface of the drum, that is to say, they preferably extend outward as far as is practicable, due regard being had for the strength of the parts and the size or thickness of, and movement of the segment, all as will be understood from the following description. The segments, lettered E, two or more in number, are preferably cast and finished to fit the inner or friction surface of the drum accurately, and are as rigid as is found necessary for the size of the clutch being manufactured, and the work to be performed thereby. At some point in their length, preferably near the end, they are connected to and carried by spring arms F, which latter, run as near as may be, in substantially straight lines, to the outer end of the rigid driving arms D, to which they are connected. As shown, the hub C, arms D, spring arms F, and segments are formed in a single casting, it being found that the arms F when cast are sufficiently resilient to answer all the requirements of an ordinary friction clutch. To be theoretically correct, the spring arms should be straight as shown at $F'$ and $F^2$ in Figs. 4 and 5 but in practice it is found that a slight deviation from the theoretically correct lines is immaterial, that is to say, the spring arms may be curved very slightly as illustrated for instance in Figs. 1 and 2, where the said arms are curved in an arc of much less than ninety degrees with a comparatively long radius. In every instance, in order to fall within my invention the length of the arms must be such that the pulling strain will straighten them more or less and the curvature must not be so great as to prevent the arms assuming a substantially straight line before a breaking strain is reached. When the arms are curved, provision should be made for preventing them from tearing away from the driving arms and segments by increasing the amount of metal at these points, or in any other well known manner.

By making the spring arms curved as explained, a slightly greater elasticity is secured and the whole structure presents a more symmetrical appearance.

The entire strain on the spring arms it will now be seen is transmitted as a pull and in order that this pull may tend as little as possible to draw the segments away from the drum, the spring arms should not be longer than the hypotenuse of a right angle triangle, having its right angle at the center of rotation of the shaft, said hypotenuse joining the base and perpendicular of the angle within the circumference of the segments, and they are preferably shorter than this.

Obviously, any of the well known forms of operating mechanism may be employed to separate or expand the segments and force their outer friction surfaces into engagement with the inner surface of the drum, but as a convenient mechanism for accomplishing this, I preferably form right and left wedging surfaces or screw threads in the oppositely located ends of the segments, and mount in them corresponding shafts having wedging surfaces or threads thereon as shown at H, Fig. 4, with a central hub I having arms $i$ projecting therefrom and adapted to be pivotally connected with the longitudinally movable clutch operating collar K, by means of links $k$. Thus, when the collar is moved longitudinally of the shaft by means of the clutch operating lever co-operating with the annular groove therein, the arms $i$ will be turned, together with the cam shaft H, and the clutch segments will be given a movement toward or away from each other, according to the direction of movement of the collar as will be readily understood.

In Figs. 4 and 5, as before mentioned, the spring arms are straight and run in direct lines between the clutch segment and outer end of the driving arm, and while the construction shown in Fig. 4, is the same as that shown in Figs. 1 and 2, in that the spring arms extend from the driving arms in both directions or to opposite ends of the clutch, thus adapting the clutch for rotation in either direction, in the construction, shown in Fig. 5, there is but one spring arm employed for each segment, which spring arm extends from the clutch segment forward in the direction of rotation. Thus the resistance applied to the periphery of the segments is overcome by the power transmitted from the driving arm, longitudinally through the spring arm, practically no transverse strain due to the transmission of the driving power taking place in the spring arm, and hence the rigid arm for driving the segments need not have a direct bearing on said segments as has heretofore been found necessary.

In every instance, it will be observed the driving power is transmitted through the spring arms as a pulling strain in lines approximately parallel with their longitudinal centers, and hence while very light and resilient spring arms may be employed, nevertheless, the breaking strain of the clutch is of necessity very great owing to the fact that no lateral or torsional strain at all is brought to bear upon the said spring arms.

Besides the increased strength of the device due to the direction of the strain in the spring arms, it will be noted, that by extending the rigid driving arms out into proximity to the center of the segments, and extending the spring arms from the ends of the driving arms to the segments at points near their ends, there is little or no tendency to draw the segments away from the drum as the resistance increases. Instead of tending to draw the segments away from the drum, as would be the case if the spring arms extended inward to a point near the hub, the tendency is to slide the segments endwise around the drum, and thus the binding of the expanders or segment operating mechanism is entirely done away with.

Having thus described my invention, what I claim as new is—

1. In a friction clutch the combination with the drum, radially movable clutch segments and rigid driving arms extending out in proximity to but not into engagement with the said segments, of spring arms forming the sole driving connections between the rigid driving arms and segments, said spring arms being connected to the ends of the driving arms and being in length equal to or less than equal to the hypotenuse of a right angle triangle joining its base and perpendicular within the circumference of the segments, said right angle triangle having its right angle at the center of rotation of the clutch, the relative positions of the parts being such that a straight line drawn through both ends of any spring arm will not intersect any other spring arm; substantially as described.

2. In a friction clutch, such as described, the combination with the drum and the radially movable clutch segments, of the rigid driving arms extending out in proximity to the inner sides of the clutch segments but not into engagement therewith and the spring arms extending in approximately straight lines from the ends of the driving arms to the clutch segments, whereby the driving power is transmitted through said spring arms in the direction of their longitudinal centers, with expanding mechanism for the segments; substantially as described.

3. In a friction clutch, the combination with the drum and the radially movable rigid clutch segments, of the rigid driving arms extending out in proximity to the inner sides of the clutch segments but not into engagement therewith, the spring arms constituting the sole supports for the segments and extending in approximately straight lines from the ends of the driving arms to the clutch segments, whereby the driving power is transmitted through said spring arms in the direction of their longitudinal centers and an expanding mechanism for the segments; substantially as described.

4. In a friction clutch, the combination with the drum and radially movable clutch segments, of the rigid driving arms extending out into proximity to the centers of the clutch segments but not into engagement therewith and the approximately straight arms connecting opposite ends of each clutch segment and the end of its driving arm; substantially as described.

CHARLES B. RUMSEY.

Witnesses:
C. S. POMEROY,
W. H. CRANE.